United States Patent
Elkayam et al.

(10) Patent No.: US 11,854,184 B2
(45) Date of Patent: Dec. 26, 2023

(54) DETERMINATION OF DEFECTS AND/OR EDGE ROUGHNESS IN A SPECIMEN BASED ON A REFERENCE IMAGE

(71) Applicant: Applied Materials Israel Ltd., Rehovot (IL)

(72) Inventors: Shalom Elkayam, Ramla (IL); Shaul Cohen, Irus (IL); Noam Zac, Kfar Saba (IL)

(73) Assignee: Applied Materials Israel Ltd., Rehovot (IL)

(*) Notice: Subject to any disclaimer, the term of this patent is extended or adjusted under 35 U.S.C. 154(b) by 68 days.

(21) Appl. No.: 17/149,614

(22) Filed: Jan. 14, 2021

(65) Prior Publication Data
US 2022/0222797 A1 Jul. 14, 2022

(51) Int. Cl.
*G06T 7/00* (2017.01)
*G06T 7/12* (2017.01)
(Continued)

(52) U.S. Cl.
CPC ............... *G06T 7/001* (2013.01); *G06T 7/12* (2017.01); *G06T 7/155* (2017.01); *G06T 7/174* (2017.01);
(Continued)

(58) Field of Classification Search
CPC . G06T 7/0004–001; G06T 2207/30148; G06T 7/30–37; G06T 3/20; G06T 3/0093; G06T 3/0068; G06T 3/0075; G06T 3/0081; G06T 3/0006; G06T 3/60; G06T 7/70–77; G06T 7/12; G06T 7/155; G06T 7/174; G06T 2207/10061; G06T 2207/20076; G06T 2207/20084; G01N 21/8851;
(Continued)

(56) References Cited

U.S. PATENT DOCUMENTS

| 2002/0181756 A1* | 12/2002 | Shibuya | ............... G01N 21/956 |
| | | | 356/237.4 |
| 2015/0287201 A1* | 10/2015 | Shinoda | .................. G06T 7/337 |
| | | | 382/144 |

(Continued)

OTHER PUBLICATIONS

"Line Edge Roughness (LER)," Semiconductor Engineering, Archived Jun. 1, 2020, <https://web.archive.org/web/20200601081641/https://semiengineering.com/knowledge_centers/manufacturing/lithography/line-edge-roughness-ler/>. (Year: 2020).*

*Primary Examiner* — Ian L Lemieux
(74) *Attorney, Agent, or Firm* — Lowenstein Sandler LLP

(57) ABSTRACT

There are provided systems and methods of obtaining a segmented image of a semiconductor specimen, the image comprising first structural elements, obtaining a reference image of the semiconductor specimen, the reference image being based on design data and comprising second structural elements, determining, for at least one pair of elements including a first structural element and a corresponding second structural element, data $D_{spat}$ informative of a spatial transformation required in order to match the elements of the pair in accordance with a matching criterion, and determining at least one of data informative of a defect in the first structural element and data informative of edge roughness of the first structural element using at least $D_{spat}$.

16 Claims, 11 Drawing Sheets

(51) Int. Cl.
*G06T 7/174* (2017.01)
*G06T 7/155* (2017.01)
*G06T 7/30* (2017.01)

(52) U.S. Cl.
CPC ...... *G06T 7/30* (2017.01); *G06T 2207/10061* (2013.01); *G06T 2207/20084* (2013.01); *G06T 2207/30148* (2013.01)

(58) Field of Classification Search
CPC ....... G01N 21/9501; G01N 2021/8854; G01N 2021/8887; G01N 23/255–2254; G01N 2223/40; G01N 2223/401; G01N 2223/402; G01N 2223/148; G01N 2223/42; G01N 2223/421; G01N 2223/426; G01N 2223/611; G01N 2223/6113; G01N 2223/6116; G01B 11/30; H04L 22/12
See application file for complete search history.

(56) References Cited

U.S. PATENT DOCUMENTS

2018/0268098 A1* 9/2018 Katzir ................. G03F 1/84
2022/0318975 A1* 10/2022 Ouchi ................. G06T 9/005

* cited by examiner

DETERMINATION OF DEFECTS AND/OR EDGE ROUGHNESS IN A SPECIMEN BASED ON A REFERENCE IMAGE

TECHNICAL FIELD

The presently disclosed subject matter relates, in general, to the field of examination of a specimen, and, more specifically, to automating the examination of a specimen.

BACKGROUND

Current demands for high density and performance associated with ultra large scale integration of fabricated devices require submicron features, increased transistor and circuit speeds, and improved reliability. Such demands require formation of device features with high precision and uniformity, which, in turn, necessitates careful monitoring of the fabrication process, including automated examination of the devices while they are still in the form of semiconductor wafers.

Examination processes are used at various steps during semiconductor fabrication to detect and classify defects on specimens. Effectiveness of examination can be increased by automatization of process(es) as, for example, Automatic Defect Classification (ADC), Automatic Defect Review (ADR), etc.

GENERAL DESCRIPTION

In accordance with certain aspects of the presently disclosed subject matter, there is provided a system to examine a semiconductor specimen, the system comprising a processor and memory circuitry (PMC) configured to obtain a segmented image of the semiconductor specimen, the image comprising first structural elements, obtain a reference image of the semiconductor specimen, the reference image being based on design data and comprising second structural elements, determine, for at least one pair of elements including a first structural element and a corresponding second structural element, data $D_{spat}$ informative of a spatial transformation required in order to match the elements of the pair in accordance with a matching criterion, and determine at least one of data informative of a defect in the first structural element and data informative of edge roughness of the first structural element using at least $D_{spat}$.

According to some embodiments, the system is configured to, for the at least one pair, determine data informative of a corrected element corresponding to the second structural element after application of a same spatial transformation to a plurality of pixels of the second structural element.

According to some embodiments, the spatial transformation includes at least one of a translation and a dilation.

According to some embodiments, the system is configured to determine data $D_{ampli}$ representative of an amplitude of the spatial transformation, wherein the same spatial transformation is applicable to pixels of an element of the pair, and determine data informative of a defect in the first structural element based at least on $D_{ampli}$.

According to some embodiments, the system is configured to, for the at least one pair, obtain data informative of a position of a first plurality of pixels of the first structural element, obtain data informative of a position of a second plurality of pixels of the second structural element, determine data $D_{corres}$ representative of a correspondence between the first plurality of pixels and the second plurality of pixels, based at least on data $D_{corres}$, determine data $D_{spat}$ informative of the spatial transformation required to match the position of the first plurality of pixels and the position of the second plurality of pixels according to a matching criterion.

According to some embodiments, $D_{corres}$ is based on at least one of a position of at least some pixels of the first and second plurality of pixels, and data informative of a local shape of at least one of the first structural element and the second structural element.

According to some embodiments, data informative of a local shape of at least one of the first structural element and the second structural element includes a direction orthogonal to a contour of at least one of the first structural element and the second structural element, and a curvature of at least one of the first structural element and the second structural element.

According to some embodiments, determining data informative of a spatial transformation includes using at least one weight attributed to at least some pixels of the first and second plurality of pixels, the weight being determined based on data $D_{corres}$.

According to some embodiments, the system is configured, for the at least one pair, determine, for each pixel of a plurality of pixels of the first structural element of the pair, a distance between the pixel and a corresponding pixel of the corrected element of the pair, and based on a distribution of the distance for a plurality of pixels, determine data informative of a defect in the first structural element.

According to some embodiments, the system is configured to, for the at least one pair, determine, for each pixel of a plurality of pixels of the first structural element of the pair, a distance between the pixel and a corresponding pixel of the corrected element of the pair, and based on a distribution of the distance for a plurality of pixels, determine data informative of edge roughness of the first structural element.

According to some embodiments, the system is configured to, for each of a plurality of pairs, determine data informative of a corrected element corresponding to the second structural element after application of a same spatial transformation to a plurality of pixels of the second structural element, determine a prospect that a defect is present in the first structural element based on at least one of data informative of an amplitude of the spatial transformation, and a distance between pixels of the first structural element and corresponding pixels of the corrected element of the pair.

According to some embodiments, the system is configured to, upon detection of a defect in a first structural element located at a first location, and detection of a defect in a first structural element located at a second location, output data indicative of a single defect for both the first location and the second location if the distance between the first location and the second location is below a threshold.

In accordance with certain other aspects of the presently disclosed subject matter, there is provided a method of examining a semiconductor specimen, comprising, by a processor and memory circuitry (PMC), obtaining a segmented image of the semiconductor specimen, the image comprising first structural elements, obtaining a reference image of the semiconductor specimen, the reference image being based on design data and comprising second structural elements, determining, for at least one pair of elements including a first structural element and a corresponding second structural element, data $D_{spat}$ informative of a spatial transformation required in order to match the elements of the pair in accordance with a matching criterion, and determining at least one of data informative of a defect in the first structural element and data informative of edge roughness of the first structural element using at least $D_{spat}$.

In accordance with other aspects of the presently disclosed subject matter, the method can include performing one or more operations as described above with reference to the system.

In accordance with other aspects of the presently disclosed subject matter, there is provided is a non-transitory computer readable medium comprising instructions that, when executed by a computer, cause the computer to perform operations in accordance with the method.

According to some embodiments, detection of defects can be based on a single image of a specimen. According to some embodiments, various types of defects can be detected. According to some embodiments, efficiency and accuracy of defect detection are improved. According to some embodiments, data informative of edge roughness is obtained.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

Figure 1:
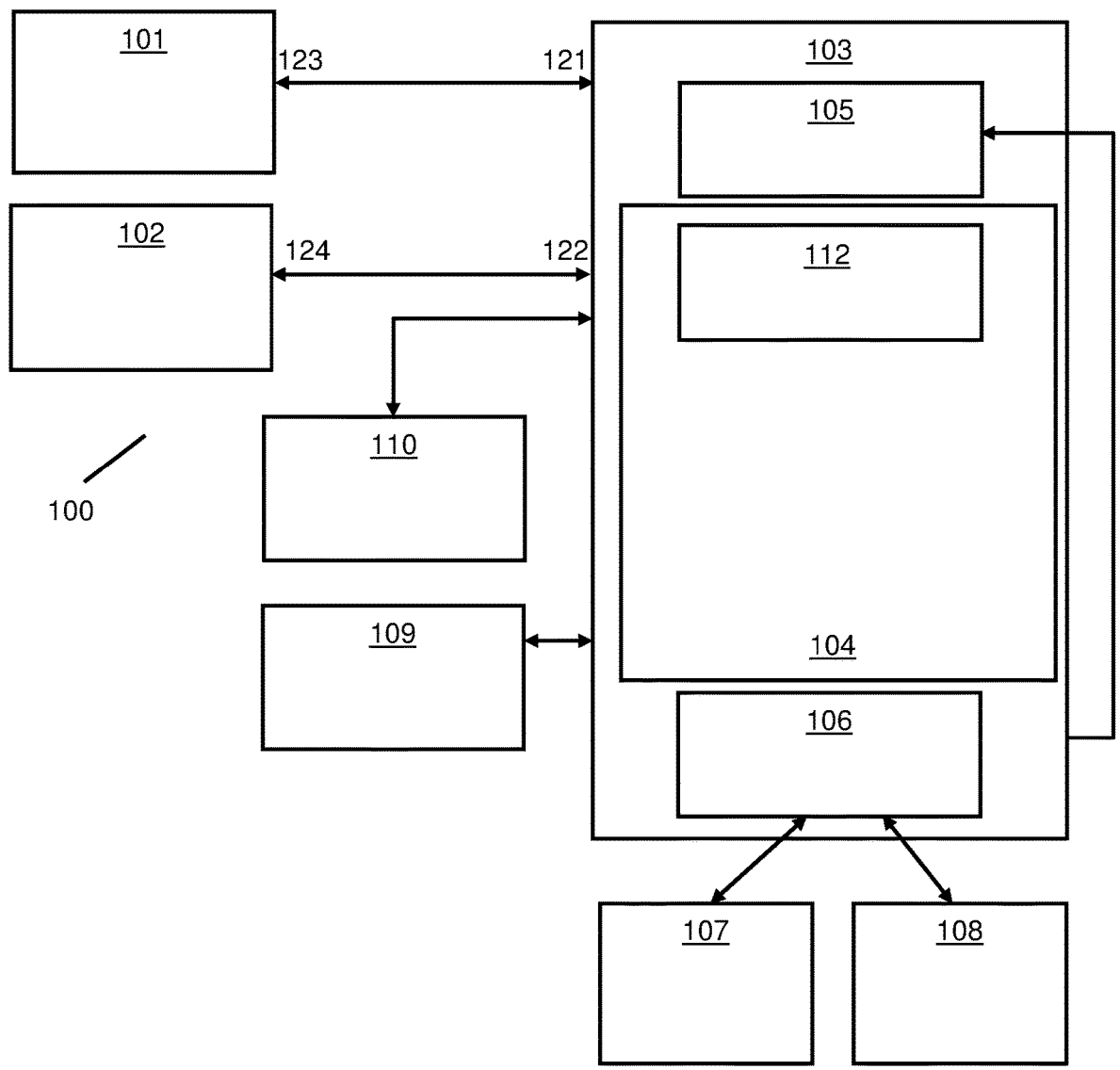
FIG. 1 illustrates a generalized block diagram of an examination system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "determining", "outputting", "using", "registering" or the like, refer to the action(s) and/or process(es) of a processor that manipulates and/or transforms data into other data, said data represented as physical, such as electronic, quantities and/or said data representing the physical objects. The term "processor" covers any computing unit or electronic unit with data processing circuitry that may perform tasks based on instructions stored in a memory, such as a computer, a server, a chip, a hardware processor, etc. It encompasses a single processor or multiple processors, which may be located in the same geographical zone or may, at least partially, be located in different zones and may be able to communicate together.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations as well as operations related to detection and/or classification of defects in a specimen during its fabrication. Examination is provided by using non-destructive examination tools during or after manufacture of the specimen to be examined. By way of non-limiting example, the examination process can include runtime scanning (in a single or in multiple scans), sampling, reviewing, measuring, classifying and/or other operations provided with regard to the specimen or parts thereof using the same or different inspection tools. Likewise, examination can be provided prior to manufacture of the specimen to be examined and can include, for example, generating an examination recipe(s) and/or other setup operations. It is noted that, unless specifically stated otherwise, the term "examination", or its derivatives used in this specification, is not limited with respect to resolution or size of an inspection area. A variety of non-destructive examination tools includes, by way of non-limiting example, scanning electron microscopes, atomic force microscopes, optical inspection tools, etc.

By way of non-limiting example, run-time examination can employ a two phase procedure, e.g. inspection of a specimen followed by review of sampled locations of potential defects. During the first phase, the surface of a specimen is inspected at high-speed and relatively low-resolution. In the first phase, a defect map is produced to show suspected locations on the specimen having high probability of a defect. During the second phase at least some of the suspected locations are more thoroughly analyzed with relatively high resolution. In some cases, both phases can be implemented by the same inspection tool, and, in some other cases, these two phases are implemented by different inspection tools.

The terms "non-transitory memory" and "non-transitory medium" used herein should be expansively construed to cover any volatile or non-volatile computer memory suitable to the presently disclosed subject matter.

The term "defect" used in this specification should be expansively construed to cover any kind of abnormality or undesirable feature formed on or within a specimen.

The term "design data" used in the specification should be expansively construed to cover any data indicative of hierarchical physical design (layout) of a specimen. Design data can be provided by a respective designer and/or can be derived from the physical design (e.g. through complex simulation, simple geometric and Boolean operations, etc.). Design data can be provided in different formats such as, by way of non-limiting examples, GDSII format, OASIS format, etc. Design data can be presented in vector format, grayscale intensity image format, or otherwise.

Embodiments of the presently disclosed subject matter are not described with reference to any particular programming language. It will be appreciated that a variety of programming languages may be used to implement the teachings of the presently disclosed subject matter as described herein.

The invention contemplates a computer program being readable by a computer for executing one or more methods of the invention. The invention further contemplates a machine-readable memory tangibly embodying a program of instructions executable by the computer for executing one or more methods of the invention.

Bearing this in mind, attention is drawn to FIG. 1 illustrating a functional block diagram of an examination system in accordance with certain embodiments of the presently disclosed subject matter. The examination system 100 illustrated in FIG. 1 can be used for examination of a specimen (e.g. semiconductor specimen such as a wafer and/or parts thereof) as part of the specimen fabrication process. The illustrated examination system 100 comprises computer-based system 103 capable of automatically determining metrology-related and/or defect-related information using images of one or more specimens. System 103 can be operatively connected to one or more low-resolution examination tools 101 and/or one or more high-resolution examination tools 102 and/or other examination tools. The examination tools are configured to capture images of specimens and/or to review the captured image(s) and/or to enable or provide measurements related to the captured image(s). System 103 can be further operatively connected to CAD (computer aided design) server 110 and/or to data repository 109.

System 103 includes a processor and memory circuitry (PMC) 104. PMC 104 is configured to provide processing necessary for operating system 103, as further detailed in the various embodiments described hereinafter, and comprises a processor (not shown separately) and a memory (not shown separately). In FIG. 1, PMC 104 is operatively connected to a hardware-based input interface 105 and to a hardware-based output interface 106.

The processor of PMC 104 can be configured to execute one or more functional modules in accordance with computer-readable instructions implemented on a non-transitory computer-readable memory comprised in the PMC. Such functional modules are referred to hereinafter as included in the PMC. Functional modules comprised in PMC 104 include a deep neural network (DNN) 112. DNN 112 is configured to enable data processing using a machine learning network/machine learning algorithm for outputting application-related data based on the images of specimens.

By way of non-limiting example, the layers of DNN 112 can be organized in accordance with Convolutional Neural Network (CNN) architecture, Recurrent Neural Network architecture, Recursive Neural Networks architecture, Generative Adversarial Network (GAN) architecture, or otherwise. Optionally, at least some of the layers can be organized in a plurality of DNN sub-networks. Each layer of the DNN 112 can include multiple basic computational elements (CE), typically referred to in the art as dimensions, neurons, or nodes.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g. the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of DNN 112 can be initially selected prior to training, and can be further iteratively adjusted or modified during training to achieve an optimal set of weighting and/or threshold values in a trained DNN 112. After each iteration, a difference (also called loss function) can be determined between the actual output produced by DNN 112 and the target output associated with the respective training set of data. The difference can be referred to as an error value. Training can be determined to be complete when a cost or loss function indicative of the error value is less than a predetermined value, or when a limited change in performance between iterations is achieved. Optionally, at least some of the DNN subnetworks (if any) can be trained separately, prior to training the entire DNN 112.

System 103 is configured to receive, via input interface 105, input data which can include data (and/or derivatives thereof and/or metadata associated therewith) produced by the examination tools and/or data produced and/or stored in one or more data repositories 109 and/or in CAD server 110 and/or another relevant data depository. It is noted that input data can include images (e.g. captured images, images derived from the captured images, simulated images, synthetic images, etc.) and associated scalar data (e.g. metadata, hand-crafted attributes, etc.). It is further noted that image data can include data related to a layer of interest and/or to one or more other layers of the specimen.

Upon processing the input data (e.g. low-resolution image data and/or high-resolution image data, optionally together with other data as, for example, design data, synthetic data, etc.) system 103 can send, via output interface 106, the results (e.g. instruction-related data 123 and/or 124) to any of the examination tool(s), store the results (e.g. defect attributes, defect classification, etc.) in storage system 107, render the results via GUI 108 and/or send to an external system (e.g. to Yield Management System (YMS) of a FAB). GUI 108 can be further configured to enable user-specified inputs related to system 103.

By way of non-limiting example, a specimen can be examined by one or more low-resolution examination machines 101 (e.g. an optical inspection system, low-resolution SEM, etc.). The resulting data (low-resolution image data 121), informative of low-resolution images of the specimen, can be transmitted—directly or via one or more intermediate systems—to system 103. Alternatively, or additionally, the specimen can be examined by a high-resolution machine 102 (e.g. a subset of potential defect locations selected for review can be reviewed by a scanning electron microscope (SEM) or Atomic Force Microscopy (AFM)). The resulting data (high-resolution image data 122) informative of high-resolution images of the specimen can be transmitted—directly or via one or more intermediate systems—to system 103.

It is noted that image data can be received and processed together with metadata (e.g. pixel size, text description of defect type, parameters of image capturing process, etc.) associated therewith.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

Without limiting the scope of the disclosure in any way, it should also be noted that the examination tools can be implemented as inspection machines of various types, such as optical imaging machines, electron beam inspection machines, and so on. In some cases, the same examination tool can provide low-resolution image data and high-resolution image data. In some cases, at least one examination tool can have metrology capabilities.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in another embodiment at least some of examination tools 101 and/or 102, data repositories 109, storage system 107 and/or GUI 108 can be external to the examination system 100 and operate in data communication with system 103 via input interface 105 and output interface 106. System 103 can be implemented as a stand-alone computer(s) to be used in conjunction with the examination tools. Alternatively, the respective functions of the system can, at least partly, be integrated with one or more examination tools.

Figure 2:
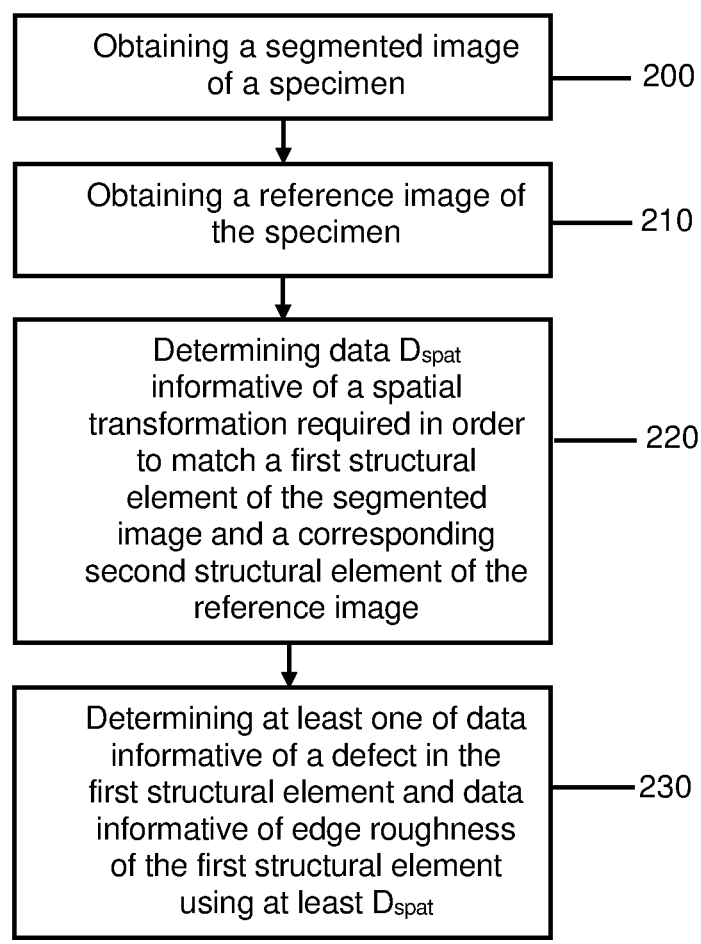
FIG. 2 illustrates a method of determining defects and/or data informative of edge roughness based on a segmented image of a semiconductor specimen and a reference image.
Figure 2A:
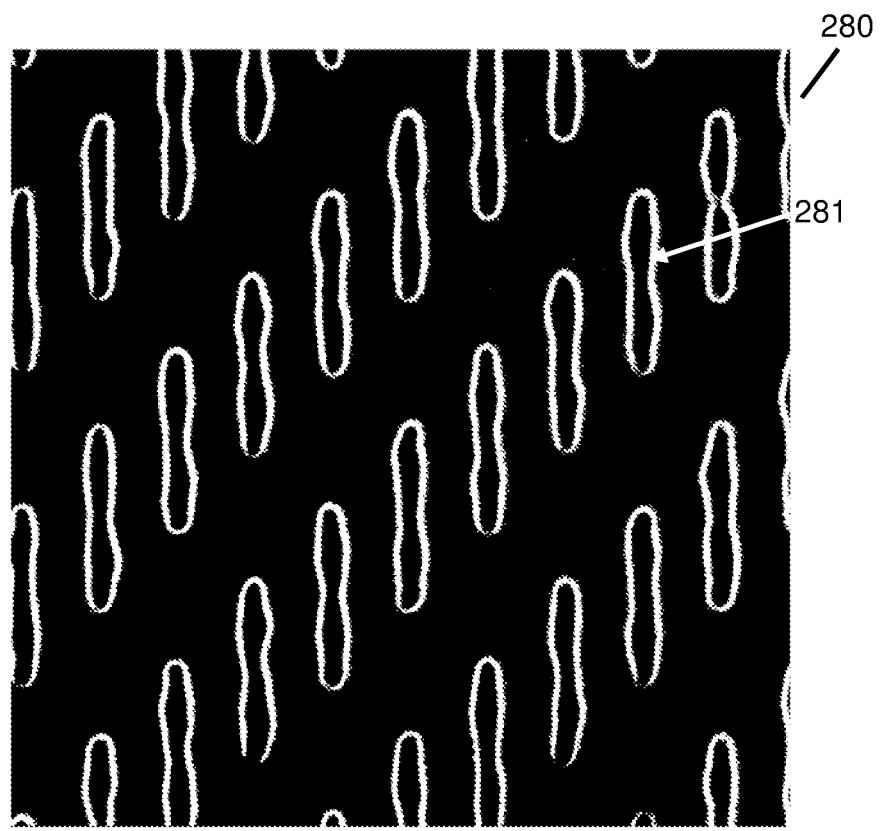
FIG. 2A illustrates a non-limitative example of a segmented image of a semiconductor specimen.

Attention is now drawn to FIG. 2. A method includes obtaining (reference 200) a segmented image of a specimen (e.g. from an area of the specimen). A non-limitative example of a segmented image 280 is provided in FIG. 2A. As visible in FIG. 2A, the segmented image 280 includes a plurality of first structural elements (281). Structural elements include (examples which are provided are not limitative) gates, transistors, contacts, or parts of these elements. The nature and/or the shape of the structural elements can be different in the image.

According to some embodiments, the segmented image is already available and obtained e.g. from a database or from any adapted source. According to some embodiments, operation 200 can include performing segmentation of an image of the specimen. This can include segmenting an image of the specimen into groups of pixels belonging to the same object, thereby identifying continuous regions corresponding to different structural elements.

Figure 2B:
FIG. 2B illustrates a non-limitative example of clustering a reference image of a semiconductor specimen.

The method includes obtaining (reference 210) a reference image of the semiconductor specimen. A non-limitative example of a reference image 285 is provided in FIG. 2B. The reference image includes second structural elements 286. The reference image is an image of a reference area of a specimen (e.g. die, cell, etc.), wherein the respective image data are verified to represent the reference area that is clear of defects and process variations. In other words, this image can be viewed as a model/reference. There are many ways to generate the reference image. According to some embodiments, the reference image is generated based on design data. According to some embodiments, the reference image can be simulated using CAD data. According to some embodiments, the reference image can correspond to a segmented image which is verified by a user to be free of defects and process variations. These methods are not limitative.

The segmented image is comparable (e.g. die-to-database, etc.) with the reference image and is informative of an area of a semiconductor specimen. The segmented image is supposed to be informative of a plurality of defects associated with the area. The area is configured to meet a similarity criterion with regard to the reference area and can belong to the same or to a different semiconductor specimen. The similarity criterion can define, for example, that the area and the reference area correspond to the same physical components or to similar zones of the semiconductor specimen (e.g. similar dies, cells, etc.).

It is noted that, in order to ensure compatibility between the images, the at least one segmented image (or the image from which the segmented image has been generated) and the reference image can undergo a registration procedure.

Assume that a given pair of elements includes a first structural element of the segmented image and a corresponding second structural element of the reference image. Generally, for a given pair, the second structural element represents the desired shape of the first structural element, or represents at least a good approximation of this desired shape.

Figure 2C:
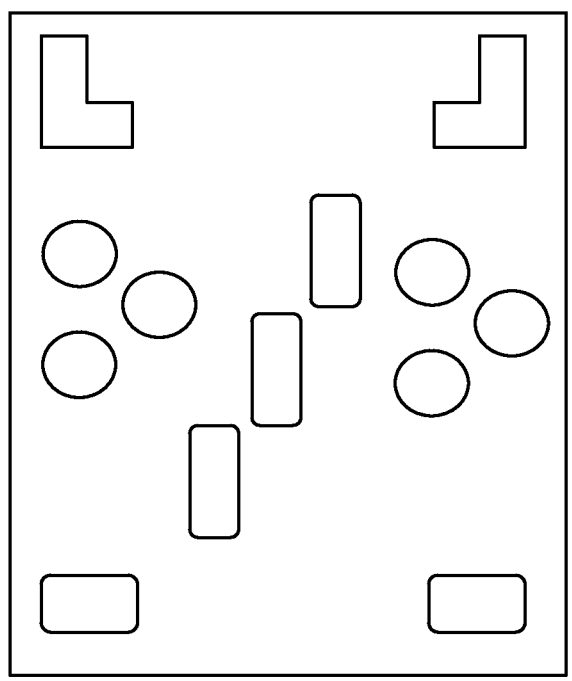
FIG. 2C illustrates a non-limitative example of a reference image of a semiconductor specimen.

Identification of a given pair of elements can include e.g. clustering the different first structural elements into clusters including structural elements with a similar shape. The same process can be applied to the reference image. A schematic example is provided in FIG. 2C in which four different clusters have been identified.

Based on this clustering, and on the position of the first and second structural elements in their respective images, a plurality of pairs of elements can be identified, each including a first structural element of the segmented image and a corresponding second structural element of the reference image.

Reverting to the method of FIG. 2, the method can include determining (operation 220), for at least one pair of elements including a first structural element and a corresponding second structural element, data $D_{spat}$ informative of a spatial transformation required in order to match the elements of the pair in accordance with a matching criterion. The matching criterion can include e.g. that the elements should match with a difference less than a threshold (if this is possible), or that the elements should match as much as possible. Various embodiments are provided hereinafter for determining $D_{spat}$.

According to some embodiments, the method further includes, for at least one pair of elements, determining (operation 230) whether the first structural element of the segmented image includes a defect using $D_{spat}$. According to some embodiments, the method includes (operation 230) determining data informative of edge roughness of the first structural element using at least $D_{spat}$. Embodiments will be provided hereinafter.

Figure 3:
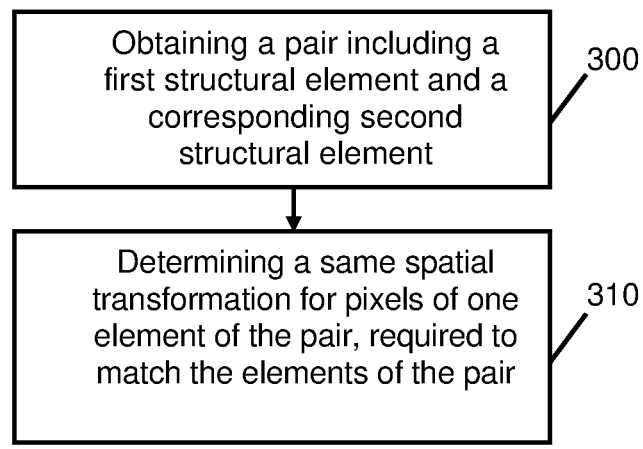
FIG. 3 illustrates a method of determining a spatial transformation required to match a first structural element of a segmented image and a second structural element of a reference image.

Attention is now drawn to FIG. 3.

Assume that a given pair of elements (including a first structural element and a corresponding second structural element) is obtained (see operation 300). According to some embodiments, determining $D_{spat}$ (as explained with reference to operation 220) includes determining (operation 310) a same spatial transformation to be applied to a plurality of pixels of an element of the pair (in particular, to pixels present on the contour of the element). In other words, all pixels of the element to which the spatial transformation is applied undergoes a common and unique spatial transformation (the spatial transformation can differ between the X axis and the Y axis).

According to some embodiments, the spatial transformation can include at least one of a translation and a dilation (in which a polygon can grow or shrink), or a combination of a plurality of these operations.

According to some embodiments, a spatial transformation to be applied to the second structural element is determined, in order to match the elements of the pair. According to other embodiments, a spatial transformation to be applied to the first structural element is determined, in order to match the elements of the pair.

Figure 3A:
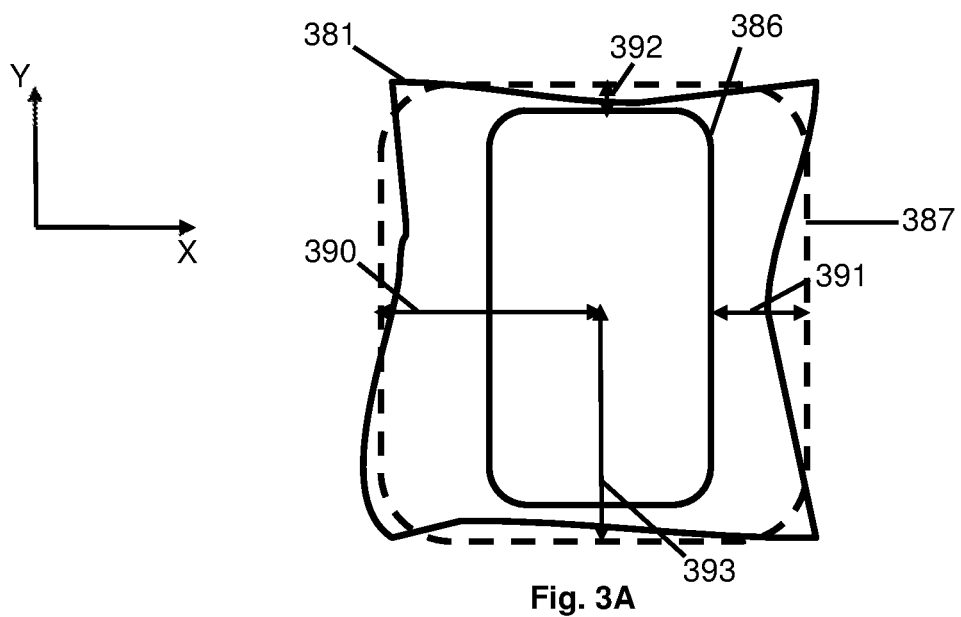
FIG. 3A illustrates a non-limitative example of the method of FIG. 3.

A non-limitative example is provided in FIG. 3A, which depicts a first structural element 381, and a corresponding second structural element 386. A spatial transformation can be determined and applied e.g. to the second structural element 386. An output of this spatial transformation is a corrected element 387. As visible in FIG. 3A, application of a same spatial transformation to pixels of the contour of the second structural element 386 provides corrected element 387.

The corrected element 387 represents the "ideal" shape (in particular, perturbations, such as process variations, present on the contour are cancelled or at least reduced) of the second structural element 386 and can be used in various applications. For example, since the noise present in the contour of the first structural element is cancelled or at least reduced, the corrected element can be used to determine distance between the corrected element and other elements of the image, or to better determine the total area covered by the first structural element. Other possible applications (in particular, detection of defects, determination of data informative of edge roughness) are described hereinafter.

Figure 3B:
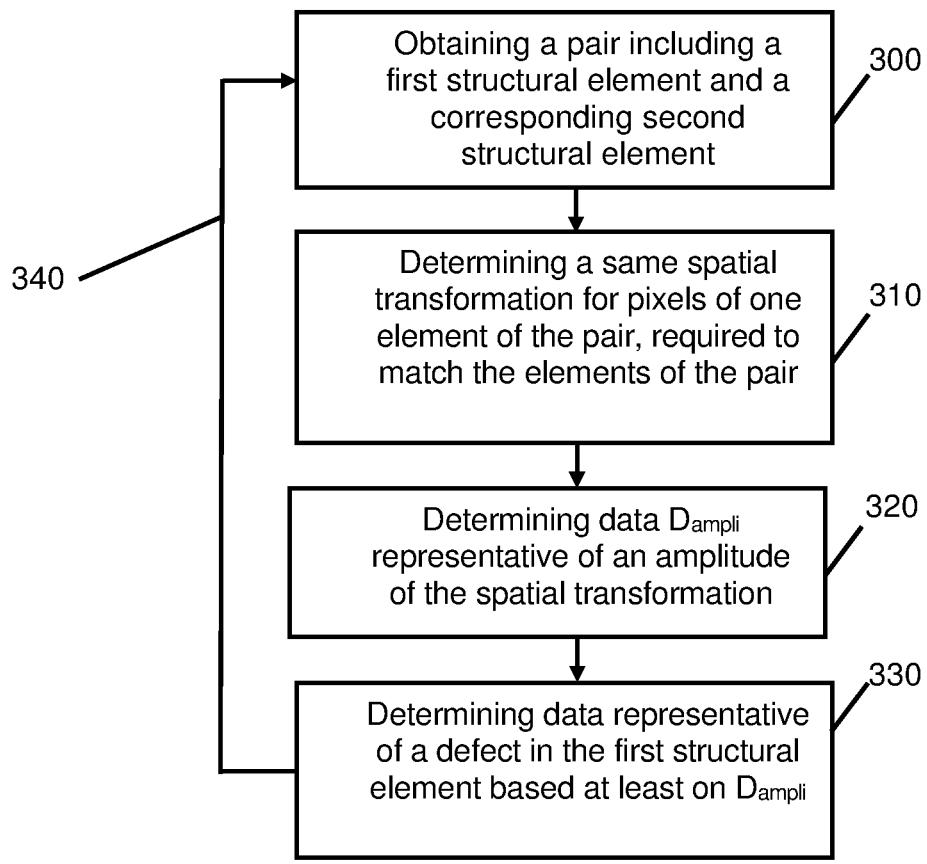
FIG. 3B illustrates a specific embodiment of the method of FIG. 2.

Attention is now drawn to FIG. 3B. According to some embodiments, a method can further include (in addition to operations 300 and 310 already described above), determining (operation 320) data $D_{ampli}$ representative of an amplitude of the spatial transformation. For example, in FIG. 3A, $D_{ampli}$ along the X axis can be represented by data informative of distance 390 and/or distance 391 (in some embodiments, this distance can be normalized with respect to the size of the second structural element before the spatial transformation). Similarly, $D_{ampli}$ along the Y axis can be represented by data informative of distance 392 and/or distance 393 (in some embodiments, this distance can be normalized with respect to the size of the second structural element before the spatial transformation). According to some embodiments, an aggregated value for $D_{ampli}$ can be determined based on $D_{ampli}$ along the X axis and $D_{ampli}$ along the Y axis. This is however not limitative.

According to some embodiments, assume that the spatial transformation can be modelled by an affine equation:

$$X_{correct} = S_X X_{ref} + T_X$$

$$Y_{correct} = S_Y X_{ref} + T_Y$$

In this equation, $X_{ref}$ (respectively $Y_{ref}$) is the position of a pixel of the second structural element of a pair along the X axis (respectively Y axis), and $X_{correct}$ (respectively $Y_{correct}$) is the position of a pixel of the corrected element along the Y axis. $S_X$ (respectively $S_Y$) is the scaling factor of the spatial transformation along the X axis (respectively Y axis). $T_X$ (respectively $T_Y$) is the translation factor of the spatial transformation along the X axis (respectively Y axis).

The method can further include determining (operation 330) data informative of a defect in the first structural element based at least on $D_{ampli}$. In particular, if $D_{ampli}$ does not meet a criterion (e.g. it is above a threshold, or below a threshold depending on the definition of $D_{ampli}$), this can be indicative of a defect. In some embodiments, if at least one of $D_{ampli}$ along axis X and $D_{ampli}$ along axis Y does not meet a criterion, this can be indicative of a defect. According to some embodiments, at least one of $S_X$, $S_Y$, $T_X$ and $T_Y$ can be compared to a threshold in order to determine whether a defect is present (in particular, a value above a threshold of $S_X$ and/or $S_Y$ is likely to indicate presence of a defect). According to some embodiments, operation 330 can include providing a first prospect (e.g. a probability $P_1$) that a defect is present. This first prospect can be determined using $D_{ampli}$. According to some embodiments, the first prospect can be generated based on the results of a comparison between $D_{ampli}$ and a criterion (such as a threshold).

The method of FIG. 3B can be applied iteratively (see reference 340) on a plurality of pairs of elements, each including a first structural element of the segmented image and a corresponding second structural element of the reference image. This provides, for each pair of elements, a first prospect that a defect is present in the first structural element.

Figure 3C:
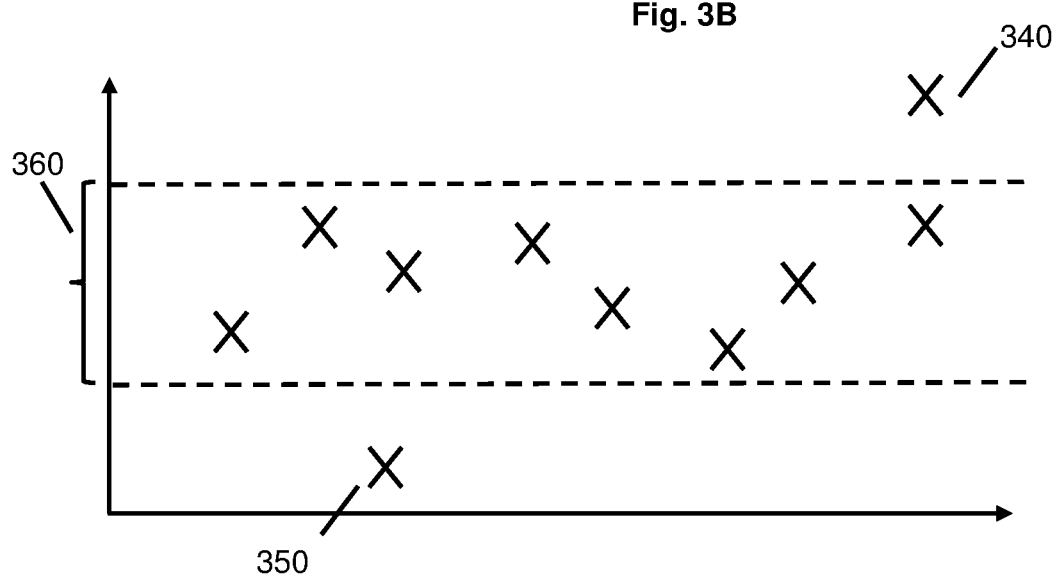
FIG. 3C illustrates a non-limitative example of a detection of defects based on the method of FIG. 3B.

According to some embodiments, for each of a plurality of pair of elements, data $D_{ampli}$ representative of the amplitude of the spatial transformation, required to match the elements of the pair, is determined. As a consequence, a distribution is obtained for various values of $D_{ampli}$. Generally, the majority of the values obtained for $D_{ampli}$ are located in the same interval, and only a few values are outside of this interval. Identification of the defects can include identifying irregular values for $D_{ampli}$ which are located outside of the interval of most of the population. A non-limitative example is illustrated in FIG. 3C, in which most of the values of $D_{ampli}$ are located in the same interval 360. Two values 340 and 350 are outside the interval 360 and are identified as corresponding to a defect.

Figure 4:
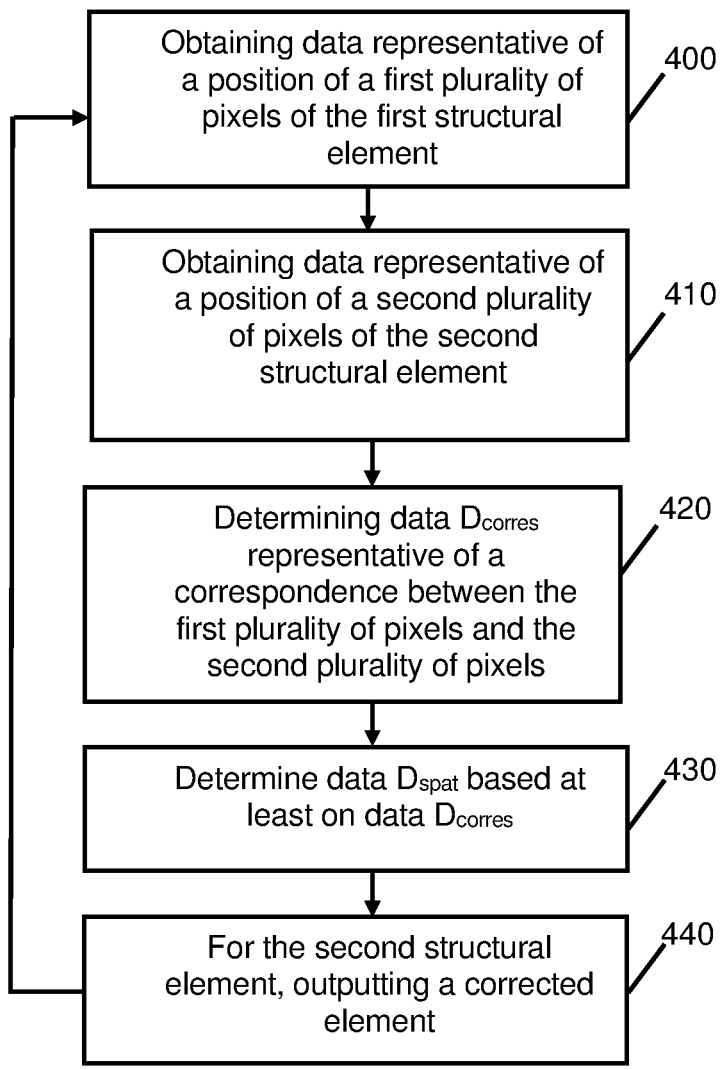
FIG. 4 illustrates a method of determining a corrected element based on a first structural element of a segmented image and a corresponding second structural element of a reference image.

Attention is now drawn to FIG. 4, which depicts a method of determining a spatial transformation required to match two structural elements of a pair. The method can include obtaining (400) data informative of a position of a first plurality of pixels of the first structural element. In particular, this can correspond to pixels located on the contour of the first structural element. The method can include obtaining (410) data informative of a position of a second plurality of pixels of the second structural element. In particular, this can correspond to pixels located on the contour of the second structural element.

The method can further include determining (420) data $D_{corres}$ representative of a correspondence between the first plurality of pixels and the second plurality of pixels. In other words, it is attempted to determine, for each given pixel of the first structural element (respectively of the second structural element), to which pixel of the second structural element (respectively of the first structural element) it corresponds.

According to some embodiments, $D_{corres}$ is based on at least one of position of at least some pixels of the first and second plurality of pixels, and data informative of a local shape of at least one of the first structural element and the second structural element. If a given pixel of the first structural element and a given pixel of the second structural element have a position which correspond according to a criterion, there is a likelihood that these two pixels correspond one to the other. In order to further improve this correspondence, local shape can be also taken into account. This can be illustrated in the non-limitative example of FIG. 4A.

Figure 4A:
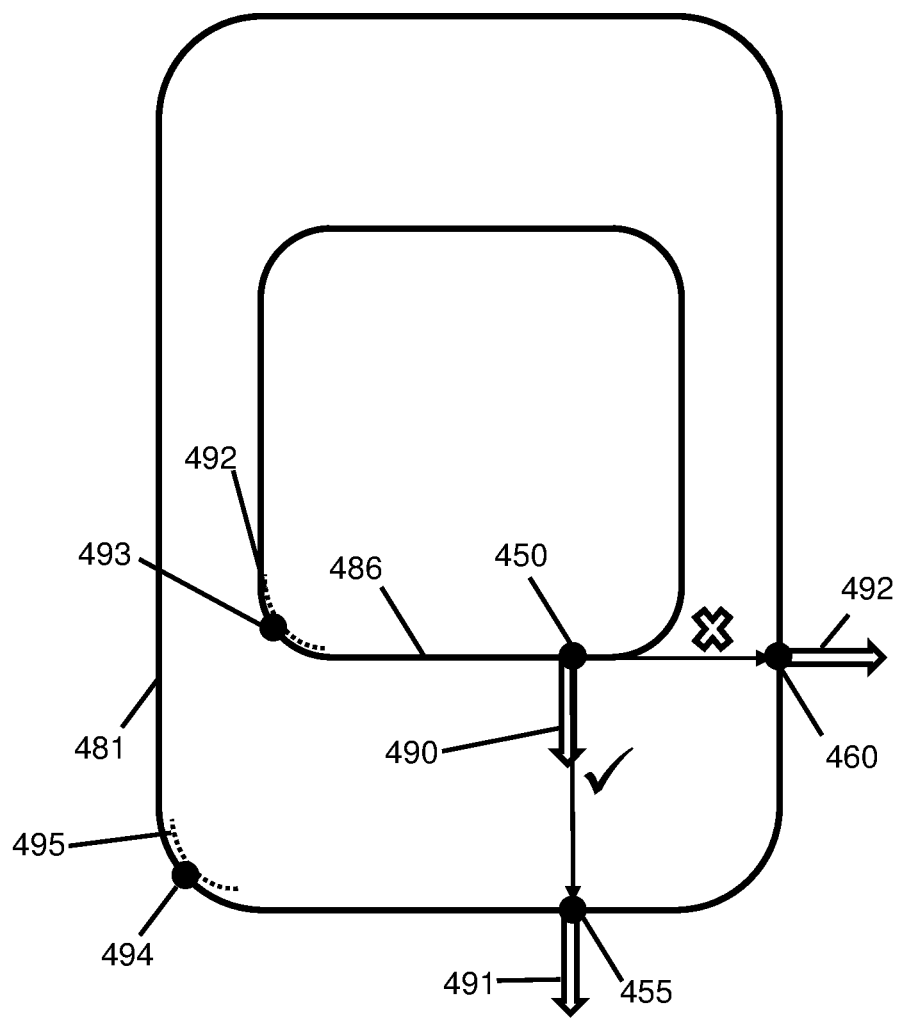
FIG. 4A illustrates a non-limitative example of the method of FIG. 4.

In FIG. 4A, it is attempted to determine a pixel of a first structural element 481 which corresponds to pixel 450 of a second structural element 486. If only relative position of the pixels is considered, then pixel 460 is the pixel of the first structural element 481 which best corresponds to pixel 450. However, as visible in FIG. 4A, in this particular case, pixel 455 better corresponds to pixel 450. By taking into account also matching of the shape of the first and second structural elements, it can be determined that pixel 455 corresponds best to pixel 450, although pixel 455 is located farther from pixel 450 than pixel 460.

According to some embodiments, local shape can include a direction orthogonal to a contour of at least one of the first structural element and the second structural element. This direction is also called normal to the contour. For example, in the illustration of FIG. 4A, a normal to the contour of the second structural element 486 in the vicinity of pixel 450 is represented by arrow 490, a normal to the contour of the first structural element 481 in the vicinity of pixel 455 is represented by arrow 491 and a normal to the contour of the first structural element 481 in the vicinity of pixel 460 is represented by arrow 492. As visible in FIG. 4A, the normal 490 matches, to a greater extent, the normal 491 than the normal 492.

According to some embodiments, data informative of a local shape of at least one of the first structural element and the second structural element includes a curvature of at least one of the first structural element and the second structural element. For example, it can be determined a local curvature of a contour of the element around the pixel under examination. This is illustrated in FIG. 4A, in which a local curvature 492 is determined for pixel 493 and a local curvature 495 is determined for pixel 494. Other data informative of the local shape can be determined, depending on the needs.

According to some embodiments, a cost function can be determined in order to determine correspondence between the first and second plurality of pixels. The cost function can express a level of correspondence between pixel $P_1$ (from the first structural element) and pixel $P_2$ (from the second structural element), based e.g. on the Euclidian distance between $P_1$ and $P_2$ and difference between data informative of local shape for pixel $P_1$ and data informative of local shape for pixel $P_2$.

Reverting to the method of FIG. 4A, once $D_{corres}$ has been determined, $D_{spat}$ can be determined using $D_{corres}$. Indeed, since $D_{corres}$ indicates couples of pixels of the first and second structural elements which correspond one to the other, then $D_{spat}$ can be determined by determining the spatial transformation which is required to ensure a spatial match of these couples of pixels.

According to some embodiments, and as mentioned above, the spatial transformation is expressed as a single transformation (e.g. affine function) to be applied similarity to pixels of the second structural element, in order to obtain a corrected element matching the first structural element. A non-limitative modelling of this spatial transformation is provided below:

$$\begin{pmatrix} X_{Seg} \\ Y_{Seg} \end{pmatrix} = \begin{bmatrix} S_x & 0 & T_x \\ S_y & 0 & T_y \end{bmatrix} \begin{bmatrix} X_{Ref} \\ Y_{Ref} \\ 1 \end{bmatrix}$$

In this expression, $X_{Seg}$ and $Y_{Seg}$ are the spatial coordinates of a first pixel of the first structural element, $X_{Ref}$ and $Y_{Ref}$ are the spatial coordinates of a second pixel of the second structural element, wherein the first pixel and the second pixel have been identified as corresponding one to the other according to $D_{corres}$. $S_X$, $S_Y$, $T_X$ and $T_Y$ are the parameters of the affine transformation, which are to be determined.

Since a plurality of couples of matching pixels are available based on $D_{corres}$, a global optimization problem can be solved, which can be expressed as follows (this is not limitative):

$$E(T_x, T_y, S_x, S_y) = \sum_p [(X_{Seg}^p - S_x X_{Ref}^p - T_x)^2 + (Y_{Seg}^p - S_y Y_{Ref}^p - T_y)^2]$$

$$\frac{\partial E}{\partial \theta_i} = 0, \theta = [S_x \quad S_y \quad T_x \quad T_y]^T$$

In this expression, for each couple "p" of pixels provided by $D_{corres}$, $X_{Seg}^p$ and $Y_{Seg}^p$ are the spatial coordinates of a first pixel of the first structural element, and $X_{Ref}^p$ and $Y_{Ref}^p$ are the spatial coordinates of a second pixel (corresponding to the first pixel) of the second structural element.

Once the parameters of the spatial transformation have been determined, the method can include outputting a corrected element. According to some embodiments, the spatial transformation is applied to the second structural element (of the reference image) in order to obtain a corrected element. For example, in FIG. 3A, the second structural element 386 is transformed (after the spatial transformation) into the corrected element 387. This is not limitative, and in other embodiments, a spatial transformation is determined and applied to the first structural element, in order to obtain a corrected element.

Figure 4B:
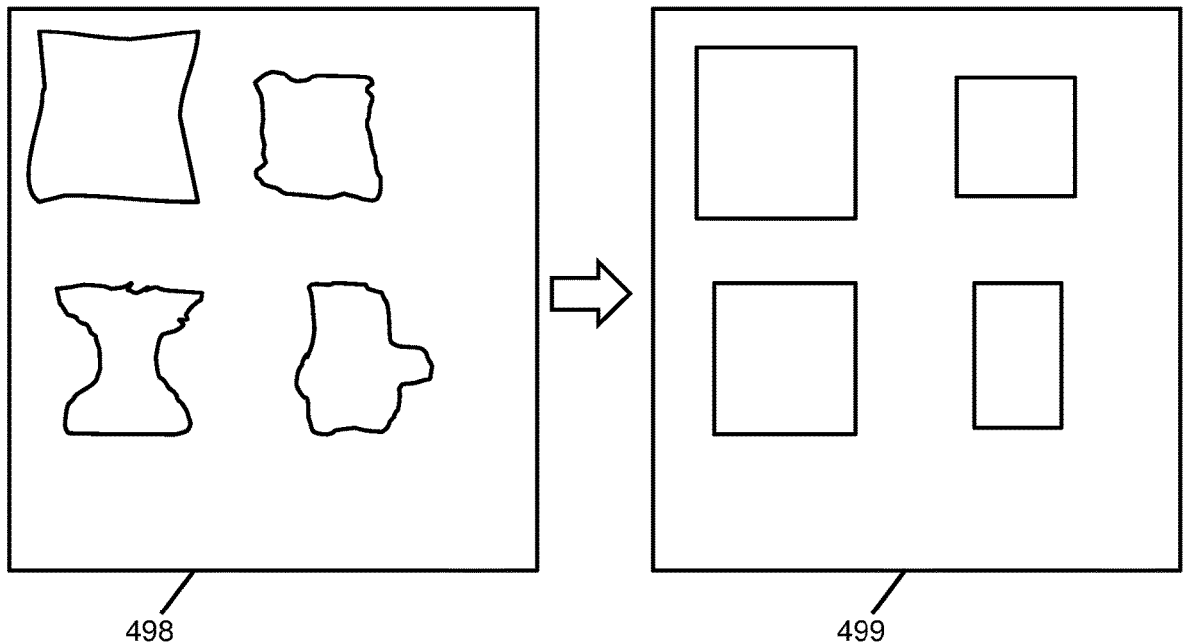
FIG. 4B illustrates a non-limitative example of the method of FIG. 4 on a whole image.

The method of FIG. 4 can be repeated iteratively for each of a plurality of pair of elements including a first structural element of the segmented image and a corresponding second structural element of the reference image. As a consequence, a corrected image (including all corrected elements) can be generated. A non-limitative example is illustrated in FIG. 4B, in which image 498 is converted into the corrected image 499.

Figure 5:
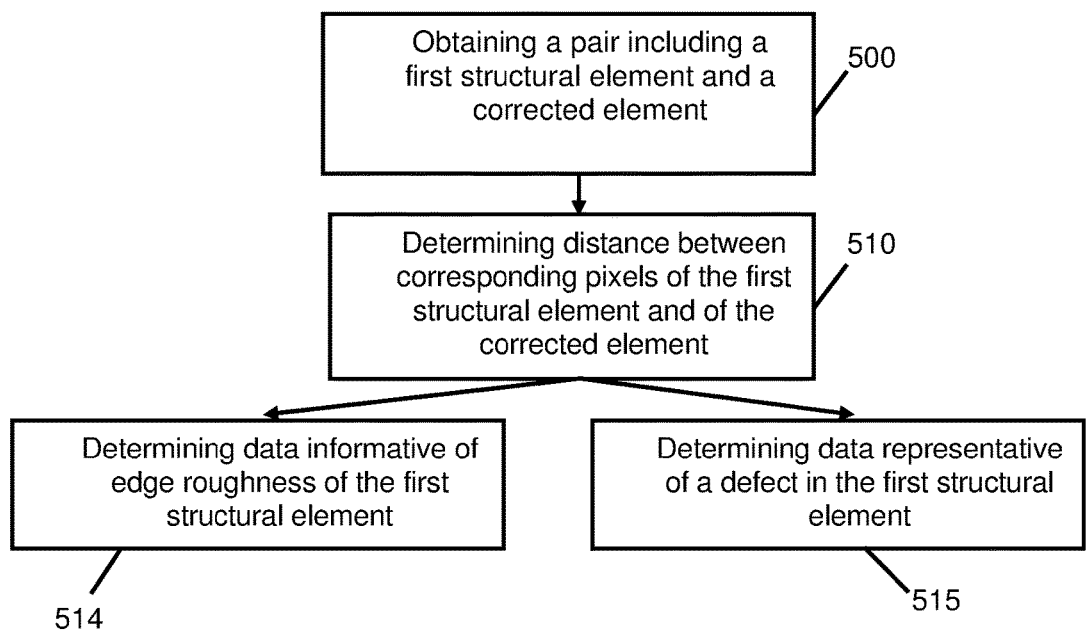
FIG. 5 illustrates a method of determining data informative of edge roughness and/or of defects based on a segmented image of a semiconductor specimen and a reference image.

Attention is now drawn to FIG. 5. Assume that for a pair including a first structural element of the segmented image and a corresponding second structural element of the reference image, the second structural element has been modified into a corrected element as explained in the various embodiments above (operation 500). The method can include determining, for each pixel of a plurality of pixels of the first structural element of the pair, a distance (e.g. Euclidian distance) between the pixel and a corresponding pixel of the corrected element of the pair (operation 510). Corresponding pixels are known e.g. from the output of operation 420 (see FIG. 4), which provides corresponding pixels between the first structural element and the corresponding second structural element. Since the corrected element includes pixels of the second structural element after a geometrical transformation (e.g. translation/dilation), corresponding pixels of the first structural element and the corrected element are known. This is however not limitative.

According to some embodiments, for each pixel of a plurality of pixels of the first structural element, a distance between the pixel and a corresponding pixel of the corrected element is determined. As a consequence, a distribution of the values of the distance is obtained (hereinafter "distance distribution"—see e.g. a non-limitative example in FIG. 5B).

This distance distribution can be used for various applications.

According to some embodiments, the distance distribution can be used to determine data informative of edge roughness of the first structural element (see operation 514). Indeed, since the contour of the corrected element is generally free of process variations, it can be used as a reference to determine data informative of edge roughness in the contour of the first structural element.

According to some embodiments, the distance distribution can be used to determine data informative of a defect in the first structural element (operation 515). In some embodiments, this distance distribution can be used to detect specific pixels for which this distance corresponds to an anomaly (defect—see e.g. FIG. 5A).

According to some embodiments, the distance distribution can be used both to determine data informative of edge roughness of the first structural element and to determine data informative of a defect in the first structural element.

Figure 5A:
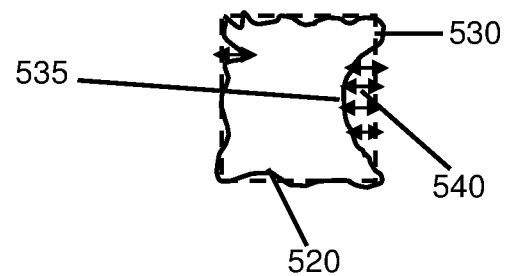
FIGS. 5A and 5B illustrate a non-limitative example of the method of FIG. 5.
Figure 5B:
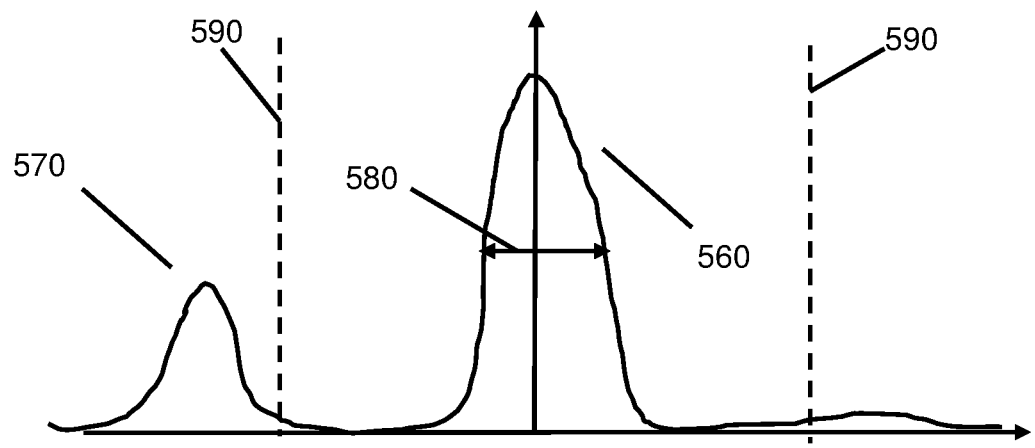

A non-limitative example is illustrated in FIG. 5A. Assume that the first structural element is represented as element 520 and that the corrected element (associated with the first structural element) is represented as element 530. A plurality of distances 540 are computed between corresponding pixels. As mentioned above, this can be performed for a plurality of pairs, each pair including a first structural element and a corresponding corrected element. For each pair, a distribution 560 of distances can be obtained, as illustrated in FIG. 5B.

Since most of the pixels are such that the distance between the first structural element and the corrected element is small, the distribution is generally centered around a value close to zero (main peak). Determination of data informative of edge roughness can include for example determining the standard deviation (reference 580—or other relevant statistical data) associated with the main peak 561 of the distance distribution 560.

A second peak 570 is visible in the distribution, which is centered around a given negative value of the distance. This second peak does not match with the distribution of distances associated with most of the pixels, and therefore it can be identified that all pixels belonging to this second peak correspond to a defect. In the particular example of FIG. 5A, the peak 570 corresponds to pixels 535 (for which an intrusion is present in the first structural element 520 with respect to the corrected element 530).

Identification of pixels which belong to a defect can include determining statistical data informative of the distance for pixels which belong to the "majority" of the population. For example, this statistical data can include e.g. standard deviation (STD) 580 as illustrated in FIG. 5B. A threshold can be set, based on the statistical data. For example, any pixel for which the distance has an absolute value which is above N*STD (N can be selected e.g. by an operator, for example N=3) is considered as belonging to a defect. This is illustrated in FIG. 5B, in which peak 570 corresponds to pixels associated with a distance which is above threshold 590.

It has been explained with reference to FIG. 3B that a transformation can be determined in order to match a first structural element and a second structural element. Data informative of the amplitude of the transformation ($D_{ampli}$) can be used to detect presence of a defect in the first structural element. When a defect, which is e.g. a localized protrusion, is present in the first structural element, $D_{ampli}$ does not necessarily indicate that a defect is present, and therefore, the method of FIG. 5 can help to detect this kind of localized defect. This is however not limitative.

The method of FIG. 5 can provide various information, such as, for each pixel identified as belonging to a defect, its distance with the pixel of the corrected element, sign of the distance (which indicates whether there is an intrusion or an extrusion), etc. In some embodiments, this information can be output to a user.

Figure 6:
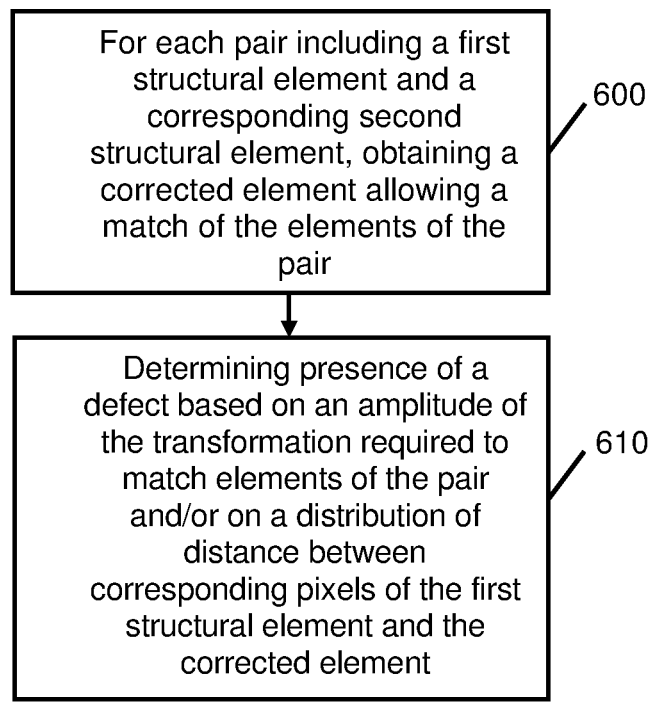
FIG. 6 illustrates a method of detecting defects based on a segmented image of a semiconductor specimen and a reference image, which combines both the method of FIG. 3B and the method of FIG. 5.

Attention is now drawn to FIG. 6. As explained with reference to the various embodiments described above, once a corrected element is obtained (operation 600) for each first structural element (see e.g. FIG. 3), various processing tasks can be performed to detect defects.

According to some embodiments, and as described with reference to FIG. 3B, data informative of the transformation (and in particular amplitude of the transformation $D_{ampli}$), required to match the corrected element with the first structural element, can be used to detect defects. As explained above, for each given first structural element of a plurality of first structural elements, data informative of the transformation can be used to determine a prospect that a defect is present in the given first structural element.

According to some embodiments, and as explained above, presence of defects can be detected using the method of FIG. 5, in which distance between corresponding pixels of the first structural element and the corrected element (generated e.g. after correction of the second structural element) is determined, thereby yielding a distance distribution (see e.g. FIG. 5B).

Therefore, and as illustrated in FIG. 6 (see operation 610), for a given pair including a first structural element and a second structural element, a prospect (e.g. a probability) of presence of a defect in the first structural element can be computed based on the amplitude of the transformation required to match elements of the pair and/or on the distribution of distance between corresponding pixels of the first structural element and the corrected element. Based on a comparison between the prospect and a criterion, a defect can be detected (for example, if the prospect is above a threshold, this can be indicative of a high likelihood that a defect is present).

According to some embodiments, assume that a first defect has been identified at a first location and a second defect has been identified at a second location, different from the first location. If the distance between the first location and the second location is below a threshold, the first defect and the second defect can be considered as a single defect ("clustering" of defects), which is output to the user as a single location covering both the first location and the second location.

It is to be noted that the various features described in the various embodiments may be combined according to all possible technical combinations. It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter. Those skilled in the art will readily appreciate that various modifications and changes can be applied to the embodiments of the invention as hereinbefore described without departing from its scope, defined in and by the appended claims.

What is claimed is:

1. A system comprising a processor and memory circuitry (PMC) configured to:
   obtain a segmented image of a semiconductor specimen, the image comprising first structural elements;
   obtain a reference image of the semiconductor specimen, the reference image being based on design data and comprising second structural elements; and
   for at least one pair of elements including a first structural element and a corresponding second structural element:
      obtain data informative of a position of a plurality of pixels of the first structural element;
      obtain data informative of a position of a plurality of pixels of the second structural element;
      use at least part of the data informative of a position of a plurality of pixels of the first structural element, at least part of the data informative of a position of a plurality of pixels of the second structural element, and data informative of a local shape of at least one of the first structural element or the second structural element, to determine data $D_{corres}$ representative of a correspondence between the plurality of pixels of the first structural element and the plurality of pixels of the second structural element, wherein data informative of a local shape of at least one of the first structural element or the second structural element includes at least one of:
         a direction orthogonal to a contour of at least one of the first structural element or the second structural element; or
         a curvature of at least one of the first structural element or the second structural element;
      use data $D_{corres}$ to determine data $D_{spat}$ informative of a spatial transformation required to match the position of the plurality of pixels of the first structural element and the position of the plurality of pixels of the second structural element according to a matching criterion; and
      determine at least one of data informative of a defect in the first structural element or data informative of edge roughness of the first structural element using at least $D_{spat}$.

2. The system of claim 1, configured to, for the at least one pair, determine data informative of a corrected element corresponding to the second structural element after application of a same spatial transformation to a plurality of pixels of the second structural element.

3. The system of claim 2, wherein the spatial transformation includes at least one of a translation or a dilation.

4. The system of claim 2, configured to, for the at least one pair:
   determine, for each pixel of a plurality of pixels of the first structural element of the pair, a distance between the pixel and a corresponding pixel of the corrected element of the pair; and
   based on a distribution of the distance for a plurality of pixels, determine data informative of a defect in the first structural element.

5. The system of claim 2, configured to, for the at least one pair:
   determine, for each pixel of a plurality of pixels of the first structural element of the pair, a distance between the pixel and a corresponding pixel of the corrected element of the pair; or
   based on a distribution of the distance for a plurality of pixels, determine data informative of edge roughness of the first structural element.

6. The system of claim 1, configured to:
   determine data $D_{ampli}$ representative of an amplitude of the spatial transformation, wherein the same spatial transformation is applicable to pixels of an element of the pair; and
   determine data informative of a defect in the first structural element based at least on $D_{ampli}$.

7. The system of claim 1, wherein determining data informative of a spatial transformation includes using at least one weight attributed to at least some pixels of the first structural element and of the second structural element, the weight being determined based on data $D_{corres}$.

8. The system of claim 1, configured to, for each of a plurality of pairs:
   determine data informative of a corrected element corresponding to the second structural element after application of a same spatial transformation to a plurality of pixels of the second structural element; and
   determine a prospect that a defect is present in the first structural element based on at least one of:
      data informative of an amplitude of the spatial transformation; or
      a distance between pixels of the first structural element and corresponding pixels of the corrected element of the pair.

9. The system of claim 1, configured to:
   upon detection of a defect in a first structural element located at a first location, and detection of a defect in a first structural element located at a second location, output data indicative of a single defect for both the first location and the second location if a distance between the first location and the second location is below a threshold.

10. A method comprising, by a processor and memory circuitry (PMC):
   obtaining a segmented image of a semiconductor specimen, the image comprising first structural elements;
   obtaining a reference image of the semiconductor specimen, the reference image being based on design data and comprising second structural elements; and
   for at least one pair of elements including a first structural element and a corresponding second structural element:
      obtaining data informative of a position of a plurality of pixels of the first structural element;
      obtaining data informative of a position of a plurality of pixels of the second structural element;
      using at least part of the data informative of a position of a plurality of pixels of the first structural element, at least part of the data informative of a position of a plurality of pixels of the second structural element, and data informative of a local shape of at least one of the first structural element or the second structural element to determine data $D_{corres}$ representative of a correspondence between the plurality of pixels of the first structural element and the plurality of pixels of the second structural element, wherein data informative of a local shape of at least one of the first structural element or the second structural element includes at least one of:
- a direction orthogonal to a contour of at least one of the first structural element or the second structural element; or
- a curvature of at least one of the first structural element or the second structural element, using data $D_{corres}$ to determine data $D_{spat}$ informative of a spatial transformation required to match the position of the plurality of pixels of the first structural element and the position of the plurality of pixels of the second structural element according to a matching criterion; and determining at least one of data informative of a defect in the first structural element or data informative of edge roughness of the first structural element using at least $D_{spat}$.

11. The method of claim 10, comprising, for the at least one pair, determining data informative of a corrected element corresponding to the second structural element after application of a same spatial transformation to a plurality of pixels of the second structural element.

12. The method of claim 11, comprising, for the at least one pair:
- determining, for each of a plurality of pixels of the first structural element of the pair, a distance between the pixel and a corresponding pixel of the corrected element of the pair; and
- based on a distribution of the distance for a plurality of pixels, determining data informative of a defect in the first structural element.

13. The method of claim 11, comprising, for the at least one pair:
- determining, for each pixel of a plurality of pixels of the first structural element of the pair, a distance between the pixel and a corresponding pixel of the corrected element of the pair; and
- based on a distribution of the distance for a plurality of pixels, determining data informative of edge roughness of the first structural element.

14. The method of claim 10, comprising:
- determining data $D_{ampli}$ representative of an amplitude of the spatial transformation, wherein the same spatial transformation is applicable to pixels of an element of the pair; and
- determining data informative of a defect in the first structural element based at least on $D_{ampli}$.

15. The method of claim 10, including configured to, for each of a plurality of pairs:
- determining data informative of a corrected element corresponding to the second structural element after application of a same spatial transformation to a plurality of pixels of the second structural element; and
- determining a prospect that a defect is present in the first structural element based on at least one of:
  - data informative of an amplitude of the spatial transformation; or
  - a distance between pixels of the first structural element and corresponding pixels of the corrected element of the pair.

16. A non-transitory computer readable medium comprising instructions that, when executed by a processor and memory circuitry (PMC), cause the PMC to perform operations comprising:
- obtaining a segmented image of a semiconductor specimen, the image comprising first structural elements;
- obtaining a reference image of the semiconductor specimen, the reference image being based on design data and comprising second structural elements; and
- for at least one pair of elements including a first structural element and a corresponding second structural element:
  - obtaining data informative of a position of a plurality of pixels of the first structural element;
  - obtaining data informative of a position of a plurality of pixels of the second structural element;
  - using at least part of the data informative of a position of a plurality of pixels of the first structural element, at least part of the data informative of a position of a plurality of pixels of the second structural element, and data informative of a local shape of at least one of the first structural element or the second structural element to determine data $D_{corres}$ representative of a correspondence between the plurality of pixels of the first structural element and the plurality of pixels of the second structural element, wherein data informative of a local shape of at least one of the first structural element or the second structural element includes at least one of:
    - a direction orthogonal to a contour of at least one of the first structural element or the second structural element; or
    - a curvature of at least one of the first structural element or the second structural element;
  - using data $D_{corres}$ to determine data $D_{spat}$ informative of a spatial transformation required to match the position of the plurality of pixels of the first structural element and the position of the plurality of pixels of the second structural element according to a matching criterion; and
  - determining at least one of data informative of a defect in the first structural element or data informative of edge roughness of the first structural element using at least $D_{spat}$.

* * * * *